(12) United States Patent
Nukaya et al.

(10) Patent No.: US 8,888,126 B2
(45) Date of Patent: Nov. 18, 2014

(54) SEAT CUSHION AIRBAG DEVICE

(71) Applicant: Toyoda Gosei Co., Ltd., Kiyosu (JP)

(72) Inventors: Akihiro Nukaya, Kiyosu (JP); Takanori Kanto, Kiyosu (JP); Hiroaki Yamada, Kiyosu (JP); Hitoshi Ida, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/939,098

(22) Filed: Jul. 10, 2013

(65) Prior Publication Data

US 2014/0015234 A1 Jan. 16, 2014

(30) Foreign Application Priority Data

Jul. 12, 2012 (JP) ................................. 2012-156710

(51) Int. Cl.
*B60R 21/207* (2006.01)
*B60R 21/2338* (2011.01)
*B60N 2/42* (2006.01)
*B60R 21/231* (2011.01)
*B60N 2/427* (2006.01)

(52) U.S. Cl.
CPC .......... *B60R 21/231* (2013.01); *B60N 2/42718* (2013.01)
USPC ................... 280/730.1; 280/743.2; 297/216.1

(58) Field of Classification Search
CPC ............. B60M 2/4221; B60M 2/4263; B60M 2/42718; B60M 2/42763; B60R 21/207; B60R 21/2338; B60R 2021/207; B60R 2021/23382
USPC ................. 180/274; 280/730.1, 743.1, 743.2; 297/216.1
See application file for complete search history.

(56) References Cited

U.S. PATENT DOCUMENTS 5,464,250 A 11/1995 Sato
6,450,529 B1 9/2002 Kalandek et al.
6,715,788 B2 * 4/2004 Saiguchi et al. ........... 280/730.1
(Continued)

FOREIGN PATENT DOCUMENTS

EP 2 065 264 A2 6/2009
JP 05229378 A * 9/1993 ............... B60N 2/42
(Continued)

OTHER PUBLICATIONS

Extended European search report dated Oct. 28, 2013 in the corresponding EP application No. 13176148.8-1758 (English translation).

*Primary Examiner* — Paul N Dickson
*Assistant Examiner* — Laura Freedman
(74) *Attorney, Agent, or Firm* — Posz Law Group, PLC

(57) ABSTRACT

A seat cushion airbag device mountable to a vehicle seat, includes an airbag includes an inflation portion including an upper fabric portion and a lower fabric portion joined to form a bag shape. The inflation portion is inflated between a support portion and a seat cushion of the vehicle seat by an inflating fluid supplied in response to an impact applied to the vehicle from a front side, such that a seat surface of the seat portion bulges, thereby suppressing a forward movement of an object to be restrained on the seat portion. The airbag further includes a restriction member which extends in a front-rear direction of the vehicle seat within the inflation portion and which bridges the upper fabric portion and the lower fabric portion to restrict an inflated thickness of the inflation portion in the upper-lower direction.

6 Claims, 10 Drawing Sheets

(56) References Cited

U.S. PATENT DOCUMENTS

| | | | |
|---|---|---|---|
| 6,863,298 B2* | 3/2005 | Sakai et al. | 280/728.1 |
| 6,935,684 B2* | 8/2005 | Sakai | 297/216.1 |
| 7,032,926 B2* | 4/2006 | Ruel | 280/743.1 |
| 7,306,257 B2* | 12/2007 | Yoshikawa et al. | 280/728.2 |
| 7,527,333 B2* | 5/2009 | Suzuki et al. | 297/216.1 |
| 7,549,674 B2* | 6/2009 | Yoshikawa et al. | 280/740 |
| 7,607,728 B2* | 10/2009 | Hiruta et al. | 297/216.1 |
| 7,878,589 B2* | 2/2011 | Murakami et al. | 297/284.11 |
| 8,573,633 B2* | 11/2013 | Kino et al. | 280/730.1 |
| 8,641,086 B2* | 2/2014 | Hashido et al. | 280/730.1 |
| 2006/0017266 A1* | 1/2006 | Yoshikawa et al. | 280/730.1 |
| 2006/0119149 A1* | 6/2006 | Yoshikawa et al. | 297/216.1 |
| 2006/0175880 A1* | 8/2006 | Hiruta et al. | 297/216.1 |
| 2006/0267325 A1* | 11/2006 | Kumagai et al. | 280/753 |
| 2007/0132214 A1* | 6/2007 | Suzuki et al. | 280/730.1 |
| 2009/0045606 A1* | 2/2009 | Yoshikawa et al. | 280/728.2 |
| 2009/0206582 A1* | 8/2009 | Kumagai et al. | 280/729 |
| 2012/0007407 A1 | 1/2012 | Komamura et al. | |
| 2013/0056964 A1* | 3/2013 | Yamashita et al. | 280/730.1 |

FOREIGN PATENT DOCUMENTS

| | | | |
|---|---|---|---|
| JP | 2007168599 A | | 7/2007 |
| JP | 2008143255 A | * | 6/2008 |
| JP | 2008162546 A | * | 7/2008 |
| JP | 2011093512 A | * | 5/2011 |
| JP | 201216970 A | | 1/2012 |
| JP | 2012126176 A | * | 7/2012 |
| WO | 02/00476 A1 | | 1/2002 |
| WO | 2012/081329 A1 | | 6/2012 |

* cited by examiner

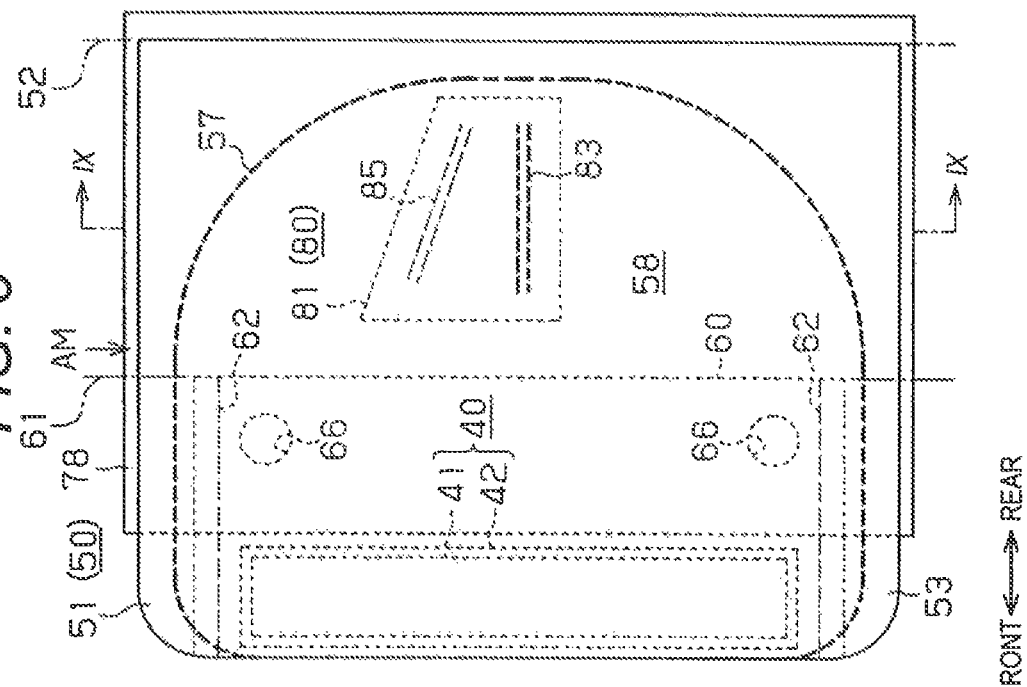
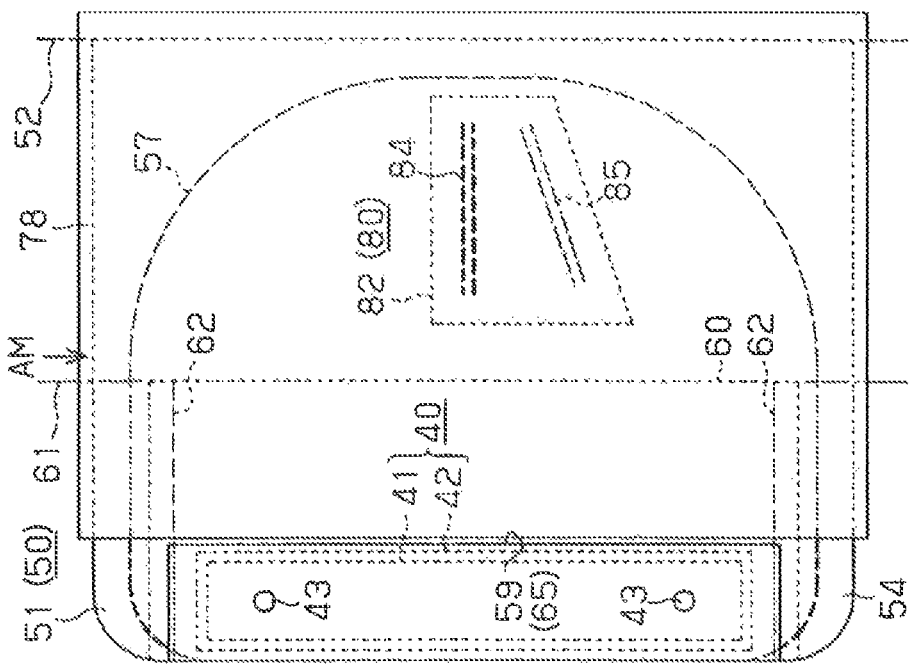

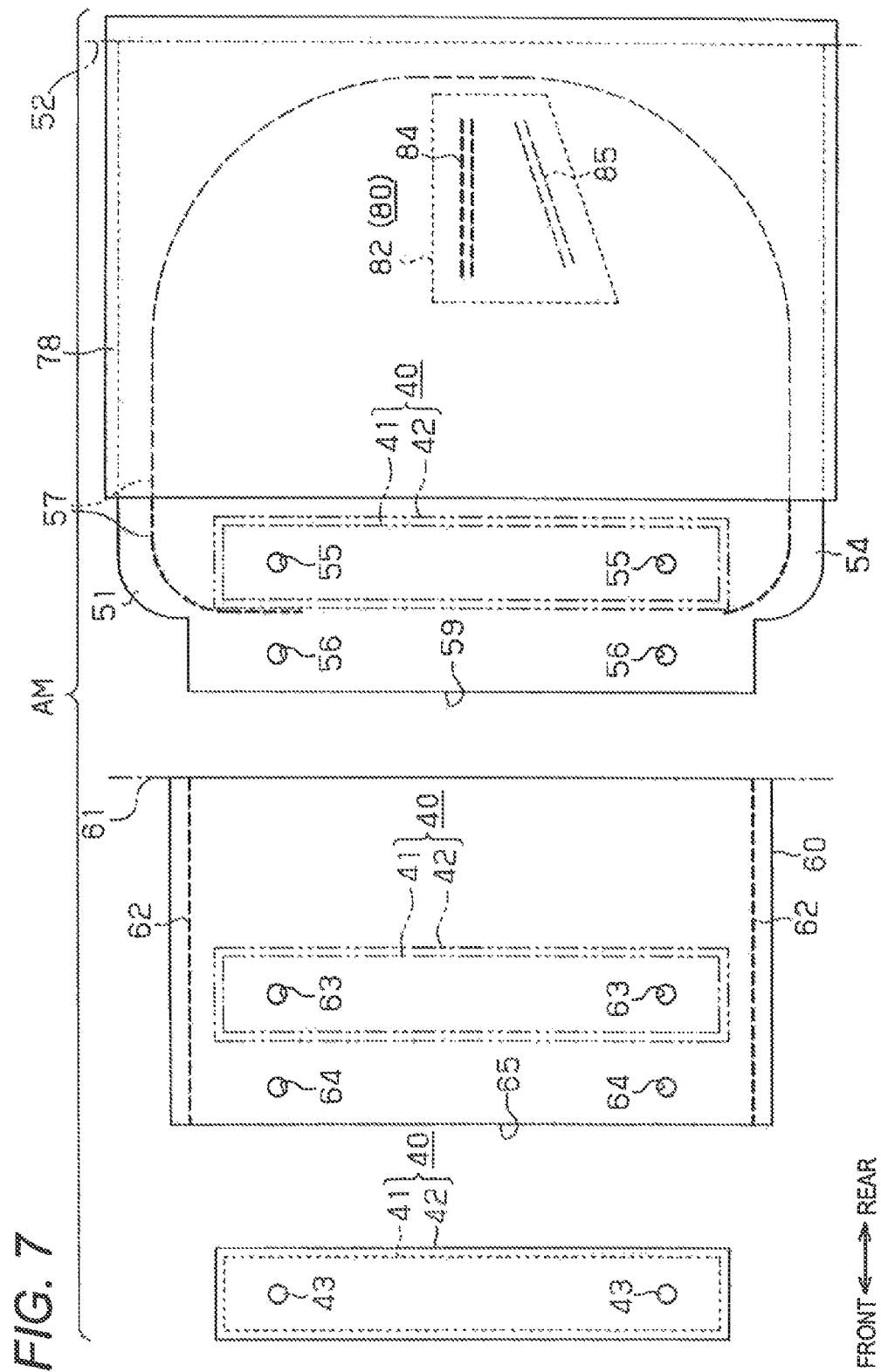

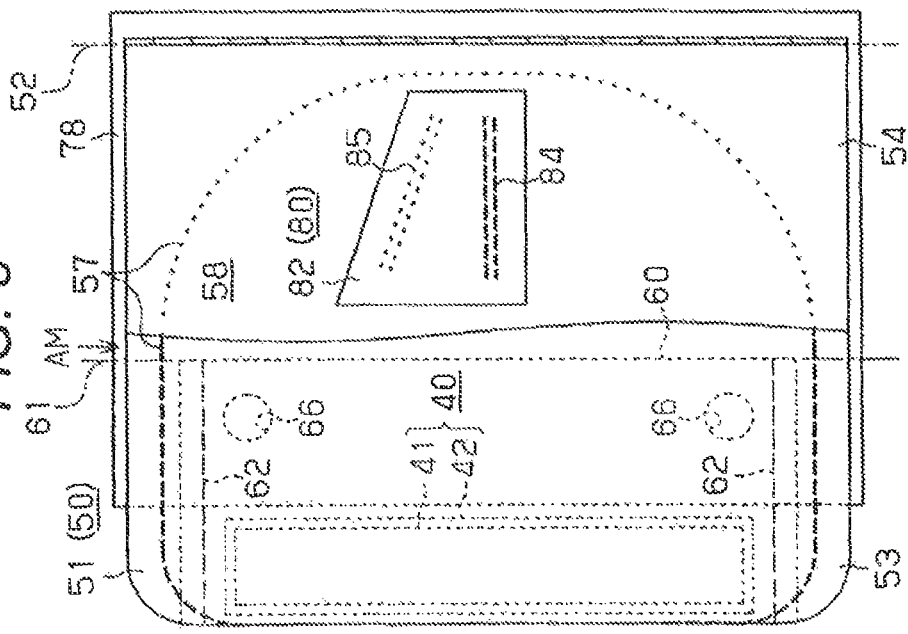
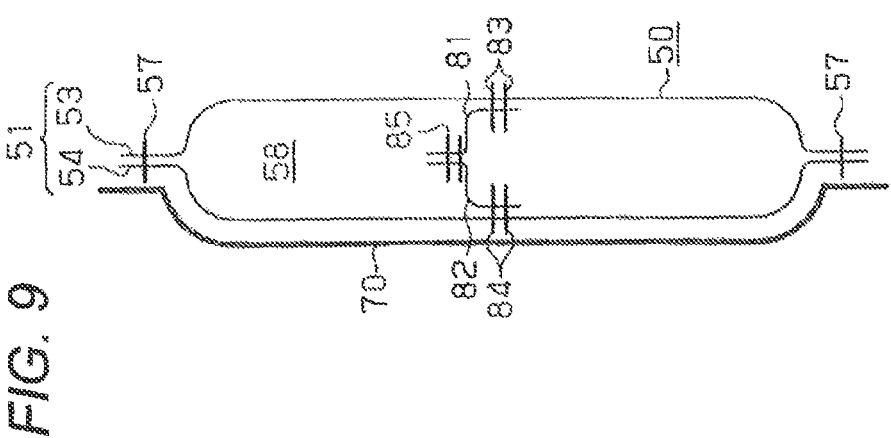

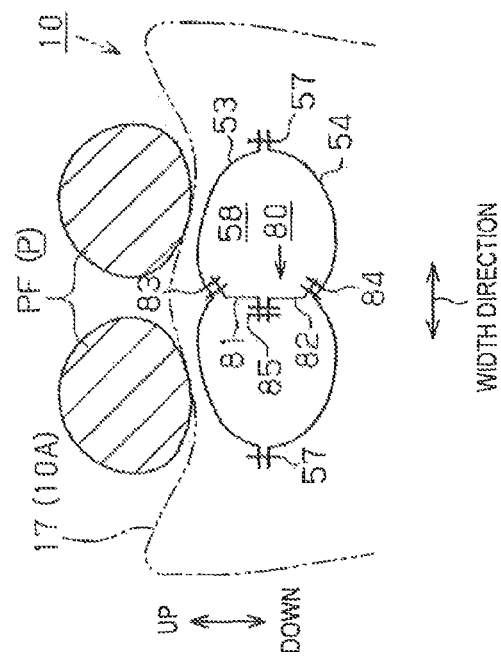
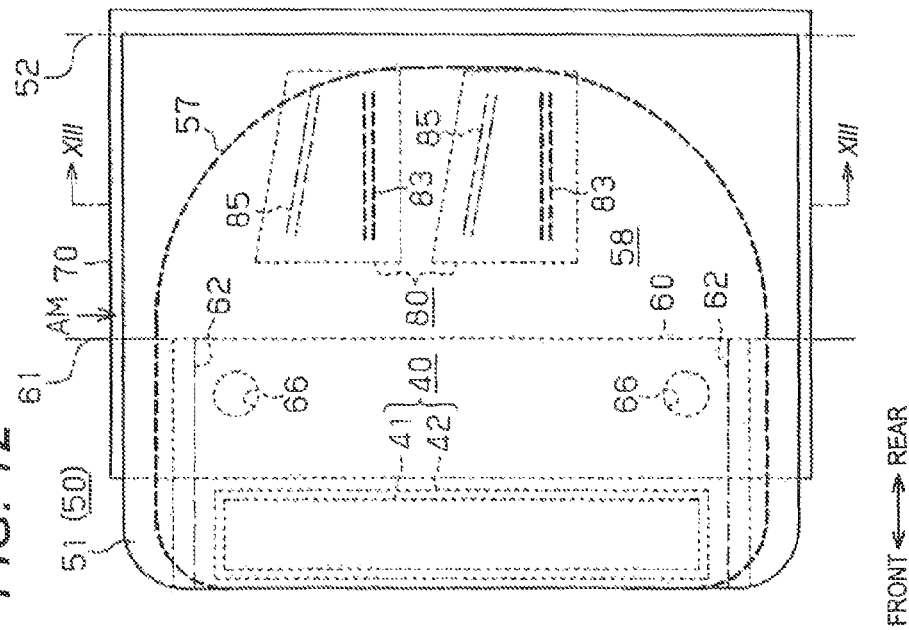

SEAT CUSHION AIRBAG DEVICE

BACKGROUND

1. Technical Field

The present invention relates to a seat cushion airbag device, which suppress a forward movement of an object to be restrained such as an occupant seated on a seat portion of a vehicle seat such as a car seat, by inflating an airbag provided in the seat portion by an inflating fluid such as an inflating gas so as to cause a seat surface to bulge.

2. Background Art

When an impact is applied to the car from the front, e.g., by a frontal collision, a waist of an occupant restrained in a car seat by a seat belt device moves forward. This is a problematic phenomenon in a car. Consequently, various measures are being taken or proposed for suppression of the phenomenon.

As one of the various measures, there is an airbag device (a seat cushion airbag device) which is mountable to a vehicle seat including a seat portion. The seat portion includes a seat cushion supported from below by a support portion of a seat frame.

The airbag device includes: an airbag including an upper fabric portion and a lower fabric portion which are arranged to overlap with each other in an upper-lower direction and which are joined to each other to form a bag shape; and an inflator provided in a front portion of the airbag. The airbag device is intended to suppress the phenomenon by inflating the airbag by an inflating gas supplied from the inflator in response to the impact caused, e.g., by the frontal collision, such that a seat surface of the seat portion bulges, thereby suppressing the forward movement of the waist of the occupant seated on the seat portion.

For example, Patent Document 1 describes a vehicular seat built with a cushion airbag device. The cushion airbag includes a waist restraining portion that is arranged at a central portion of a cushion panel; and a gas introducing portion that connects the waist restraining portion to an inflator. The cushion airbag is inflated such that the waist restraining portion reaches a higher height than the gas introducing portion. Consequently, the waist of a seated occupant is pushed upward and restrained by the waist restraining portion.

The cushion airbag device further includes a connecting member provided in the waist restraining portion. The connecting member extends in a width direction of the car seat and connects two pieces of base cloth, thereby restricting the inflated shape of the waist restraining portion.

Patent Document 2 describes an airbag formed by joining an upper cloth and a lower cloth which are overlapped with each other in the upper-lower direction by joining means such as a seam. The airbag is partitioned into a plurality of inflation portions by the seam. The inflator is provided in the inflation portion located at the most front position of the inflation portions. Further, the adjacent inflation portions communicate with each other, whereby the inflating gas blown out from the inflator is supplied to all of the inflation portions through the communication portions.

According to the airbag, each of the inflation portions partitioned by the seam is inflated, and a necessary portion of the seat surface of the seat portion bulges. Consequently, the forward movement of the waist of the occupant can be suppressed.

Patent Document 1: JP 2012-016970 A (corresponding to US 2012/0007407 A1)

Patent Document 2: JP 2007-168599 A

SUMMARY

In both of Patent Document 1 and Patent Document 2, the airbag is attached to the support portion of the seat frame through the inflator provided at the front portion of the airbag. However, the airbag is to be inflated to exhibit a curved surface shape by the inflating gas. This applies to a portion on a rear side of the connecting member of the cushion airbag device in Patent Document 1 and also applies to a portion a portion on a rear side of the seam of the airbag in Patent Document 2.

Therefore, when the waist of the occupant is to move forward due to the impact caused, e.g., by the frontal collision, a rear portion of the airbag inflated to have the curved surface shape is pushed forward through the seat cushion. As a result, the rear portion of the airbag is to roll forward around a position attached to the support portion (the front portion of the airbag) as a supporting point between the support portion and the seat cushion. Consequently, the function of the airbag for suppressing the forward movement of the waist may be insufficiently fulfilled, and the waist may run on the bulging seat cushion, thereby moving forward in association with the rolling of the airbag.

This problem may also occur when an object to be restrained other than the occupant, e.g., a bag or the like, is placed on the seat portion.

The present invention has been made in consideration of these circumstances, and an object of the present invention is to provide a seat cushion airbag device capable of suppressing rolling of an airbag between a support portion and a seat cushion, thereby further suppressing a forward movement of an object to be restrained.

According to an aspect of the present invention, there is provided a seat cushion airbag device mountable to a vehicle seat, the vehicle seat including a seat portion including a seat cushion supported from below by a support portion of a seat frame, said seat cushion airbag device including: an airbag of which a front portion is attached to the seat frame and which includes: an inflation portion including an upper fabric portion and a lower fabric portion which are arranged to overlap with each other in an upper-lower direction and which are joined to each other to form a bag shape, the inflation portion being inflated between the support portion and the seat cushion by an inflating fluid supplied from the inflating fluid generation source in response to an impact applied to the vehicle from a front side of the vehicle seat, such that a seat surface of the seat portion bulges, thereby suppressing a forward movement of an object to be restrained on the seat portion; and a restriction member which extends in a front-rear direction of the vehicle seat within the inflation portion and which bridges the upper fabric portion and the lower fabric portion to restrict an inflated thickness of the inflation portion in the upper-lower direction.

With the configuration, when an impact is applied to the vehicle from a front side of the vehicle seat, the object to be restrained on the seat portion is to move forward by inertia. In response to the impact, the inflating fluid is supplied to the inflation portion of the airbag from the inflating fluid generation source, and the inflation portion is inflated between the support portion of the seat frame and the seat cushion. By the inflation, a portion of the seat cushion higher than the inflation portion is pushed up such that the seat surface bulges, whereby the forward movement the object to be restrained on the seat portion is suppressed.

When the inflating fluid is supplied, the inflation portion is to be inflated to exhibit a curved surface shape. However, the seat cushion airbag device of this aspect includes the restriction member which extends in a front-rear direction of the vehicle seat within the inflation portion and which bridges the upper fabric portion and the lower fabric portion, and the inflated thickness of the inflation portion in the upper-lower direction is restricted by the restriction member. By the restriction, on the upper side and the lower side of the restriction member, the upper fabric portion and the lower fabric portion are substantially flat in the front-rear direction.

Therefore, even when the inflated inflation portion is pushed forward from the rear side through the seat cushion by the object to be restrained which is to move forward, the forward rolling of the airbag around the position attached to the support frame (the front portion of the airbag) as a supporting point hardly occurs. As a result, the function of the airbag for suppressing the forward movement of the object to be restrained is sufficiently fulfilled.

The restriction member allows the inflation portion to be inflated to have a curved surface being convex upward with a curvature smaller than that in a case in which the restriction member is not provided. By the inflation, a portion of the seat cushion on the upper side of the inflation portion is pushed up, and the seat surface bulges to have a curved surface gentler than that in the case in which the restriction member is not provided.

When the object to be restrained on the seat portion has a curved surface which is convex toward the opposite side of the seat surface (i.e., convex downward), for example, when the object to be restrained is an occupant to rest his femoral area having a curved surface on the seat portion, the seat cushion contacts the object to be restrained with a contact area larger than that in a case in which the restriction member is not provided. As a result, the forward movement of the occupant is received by the seat cushion which contacts the occupant with the large contact area. Consequently, the forward movement of the waist of the occupant is further suppressed also in view of this point.

In a second aspect of the present invention, there is provided the seat cushion airbag device according to the first aspect, wherein the restriction member restricts the inflated thickness in the upper-lower direction to become small toward a rear side of the inflation portion such that the upper fabric portion on an upper side of the restriction member is inclined downward toward the rear side.

With the configuration, the inflation portion of the airbag has the inflated thickness in the upper-lower direction to become small toward the rear side by the restriction member. As a result, the upper fabric portion on an upper side of the restriction member is inclined downward toward the rear side. Consequently, a portion with the reduced inflated thickness in the upper-lower direction in the inflation portion is located on the lower side of the object to be restrained, and exhibits similar effect of a wedge. In other words, in the seat portion, the above-described portion of the inflation portion serves like as a wedge which dives between the support portion of the seat frame and the seat cushion. As a result, the forward rolling of the airbag around the position attached to the support frame (the front portion of the airbag) as a supporting point more hardly occurs.

In a third aspect of the present invention, there is provided the seat cushion airbag device according to second aspect, wherein the restriction member has a shape in which an upper-lower length thereof becomes short toward the rear side when the restriction member is strained in association with inflation of the inflation portion.

With the configuration, when the inflation portion of the airbag is to be inflated, the restriction member is pulled by the upper fabric portion and the lower fabric portion in the upper-lower direction, thereby being strained. The strained restriction member restricts the inflated thickness of the inflation portion in the upper-lower direction. Here, the restriction member has a shape in which the upper-lower length thereof becomes short toward the rear side when the restriction member is strained. Consequently, the inflated thickness of the inflation portion in the upper-lower direction becomes small toward the rear side by the restriction of the inflated thickness by the restriction member.

In a fourth aspect of the present invention, there is provided the seat cushion airbag device according to the second or third aspect, wherein the object to be restrained is positioned, at least, on a rear portion of the seat portion, and wherein the restriction member is provided, at least, in a rear portion of the inflation portion.

With the configuration, when the impact is applied to the vehicle from the front side of the vehicle seat, the object to be restrained located, at least, on the rear portion of the seat portion is to move forward by inertial.

In response to the impact, the inflation portion is supplied with the inflating fluid from the inflating fluid generation source, and the inflated thickness thereof in the upper-lower direction becomes small toward the rear side by the restriction member provided, at least, in the rear portion of the inflation portion. As a result, in at least the rear portion of the inflation portion, the upper fabric portion is inclined downward toward the rear side. Consequently, the portion with the reduced inflated thickness in the upper-lower direction in the rear portion of the inflation portion is located on the lower side of the object to be restrained, and exhibits the similar effect of the wedge.

In a fifth aspect of the present invention, there is provided the seat cushion airbag device according to any one of first to fourth aspects, wherein the object to be restrained is an occupant seated on the seat portion, and wherein the restriction member is provided in a center portion of the inflation portion in a width direction of the vehicle seat.

With the configuration, the restriction member is provided in the center portion of the vehicle seat in the width direction, whereby the inflation portion is partitioned into two regions in the width direction at a portion where the restriction member is provided in the front-rear direction of the vehicle seat. Since the inflated thickness of the inflation portion in the upper-lower direction is regulated at one portion by the restriction member, each of the two regions of the inflation portion is inflated to have a curved surface being convex upward with a curvature smaller than that in a case in which the restriction member is not provided.

By the inflation, portions of the seat cushion on the upper side of the two regions of the inflation portion are pushed up, and corresponding two portions of the seat surface bulge to have curved surfaces gentler than that in the case in which the restriction member is not provided. Consequently, the two portions of the seat surface of the seat cushion contact the femoral area of the occupant seated on the seat portion with a contact area larger than that in a case in which the restriction member is not provided.

In a sixth aspect of the present invention, there is provided the seat cushion airbag device according to any one of the first to fourth aspects, wherein the object to be restrained is an occupant seated on the seat portion, and wherein the restriction member includes two members provided at two positions which are separated from each other and which are located on opposite sides of a reference in a width direction of the vehicle seat, where a center portion of the inflation portion in the width direction of the vehicle seat is taken as the reference.

With the configuration, the restriction member includes the two members provided at two positions which are separated from each other and which are located on opposite sides of the reference in the a width direction where the center portion of the inflation portion in the width direction of the vehicle seat is taken as the reference, whereby the inflation portion is partitioned into three regions in the width direction at a portion where the two members are provided in the front-rear direction of the vehicle seat. Since the inflated thickness of the inflation portion in the upper-lower direction is regulated at two portions by the two members, each of the three regions of the inflation portion is inflated to have a curved surface being convex upward with a curvature smaller than that in a case in which a single restriction member is provided.

By the inflation, portions of the seat cushion on the upper side of the three regions of the inflation portion are pushed up, and corresponding three portions of the seat surface bulge to have curved surfaces gentler than that in the case in which a single restriction member is provided in the inflation portion. Consequently, the three portions of the seat surface of the seat cushion contact the femoral area of the occupant seated on the seat portion with a contact area larger than that in the case in which a single restriction member is provided.

According to one aspect of the present invention, the restriction member extending in the front-rear direction of the vehicle seat is provided in the inflation portion of the airbag. Consequently, on the upper side and the lower side of the restriction member, the upper fabric portion and the lower fabric portion can be substantially flat in the front-rear direction, which can suppress rolling of the airbag between the support portion and the seat cushion, whereby the forward movement of the object to be restrained can be further suppressed.

BRIEF DESCRIPTION OF THE DRAWINGS

FIGS. 1A and 1B show one embodiment of the present invention, in which FIG. 1A is a side cross-sectional view showing a car seat, to which a seat cushion airbag device is mounted, together with an occupant and a seat belt device, and FIG. 1B is a partial cross-sectional side view showing an enlarged portion in the vicinity of a bolt shown in FIG. 1A;

FIG. 5 is a plan view showing an airbag module according to the embodiment;

FIG. 6 is a bottom view of the airbag module according to the embodiment;

FIG. 7 is a bottom view of elements of the airbag module (an airbag body, an inner bag and an inflator assembly) according to the embodiment;

FIG. 8 is a partial exploded plan view such that a part of the airbag body and the restriction member shown in FIG. 5 are cut at a center thereof in the upper-lower direction;

FIG. 9 is a cross-sectional view showing a cross-sectional structure the airbag module cut along a IX-IX line shown in FIG. 5;

FIG. 11 is a cross-sectional plan view showing a relationship among an airbag with a restricted inflated thickness in the embodiment, the seat portion, and a femoral area of the occupant;

FIG. 12 is a diagram corresponding to FIG. 5, but shows a modification of the airbag module including two restriction members provided therein;

DETAILED DESCRIPTION

Hereinafter, an embodiment of the present invention will be described with reference to FIGS. 1A to 11.

Figure 1:
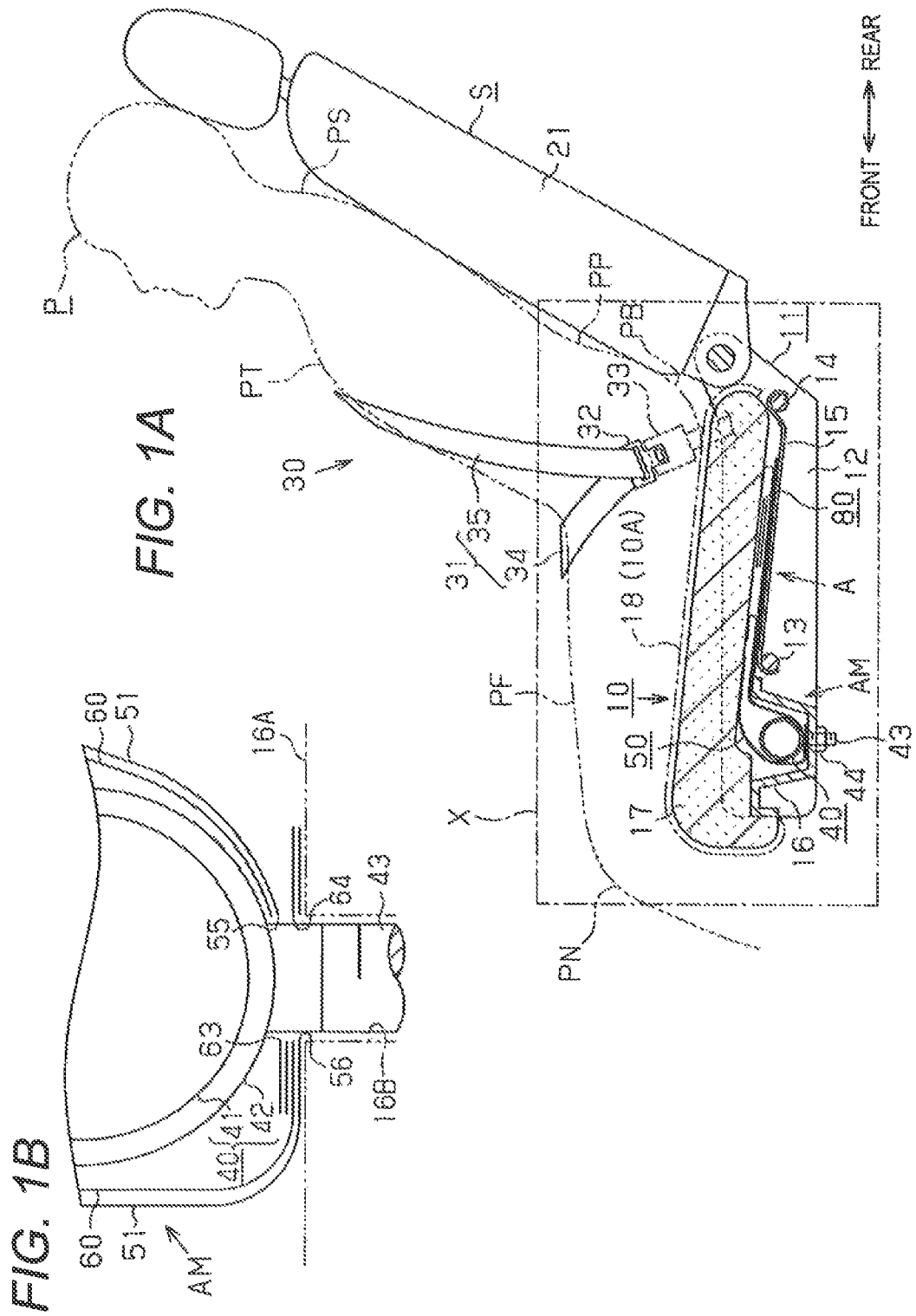
Figure 2:
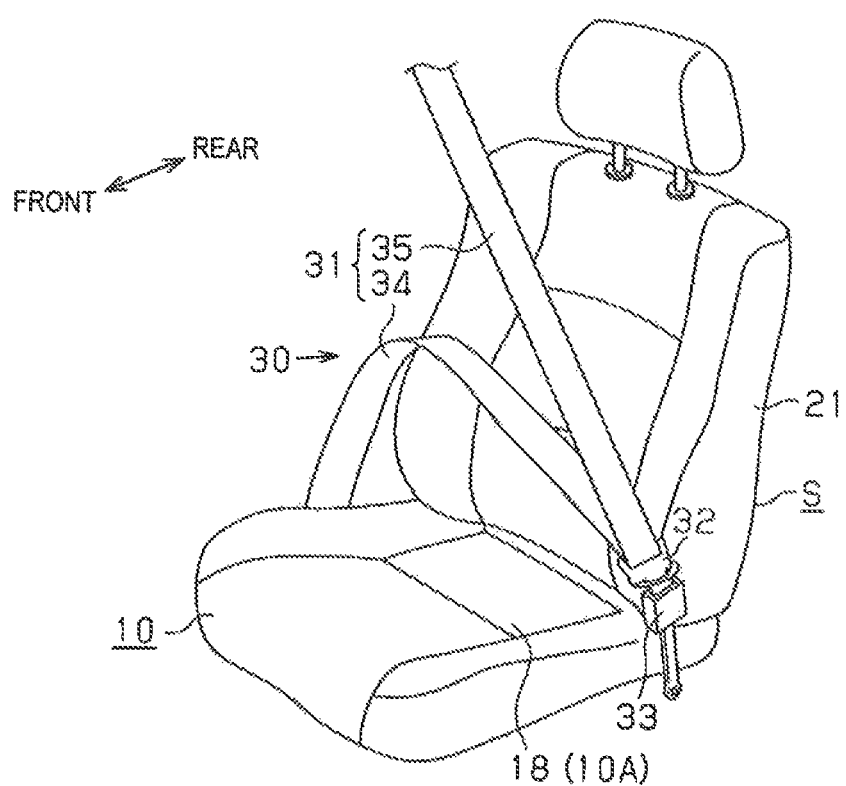
FIG. 2 is a perspective view showing a part of the car seat and the seat belt device according to the embodiment.

As shown in FIGS. 1A and 2, a car seat S serving as a vehicle seat is provided in a car serving as a vehicle. The car seat S includes: a seat portion (a seat cushion) 10; and a backrest portion (seat back) 21 which extends upward from the rear side of the seat portion 10 and of which an inclination angle is adjustable by an inclination angle adjusting mechanism (not shown). The car seat S is provided in the car such that the backrest portion 21 is directed toward a front side of the car.

In the following description, front, rear, up, down, left, right are defined where the car seat S is taken as a reference. Simply referring to a "front-rear direction" means a front-rear direction of the car seat S, and simply referring to a "width direction" means a right-left direction of the car seat S. In the embodiment, the front-rear direction corresponds to a front-rear direction of the car, and the width direction corresponds to a width direction of the car (car width direction).

Figure 3:
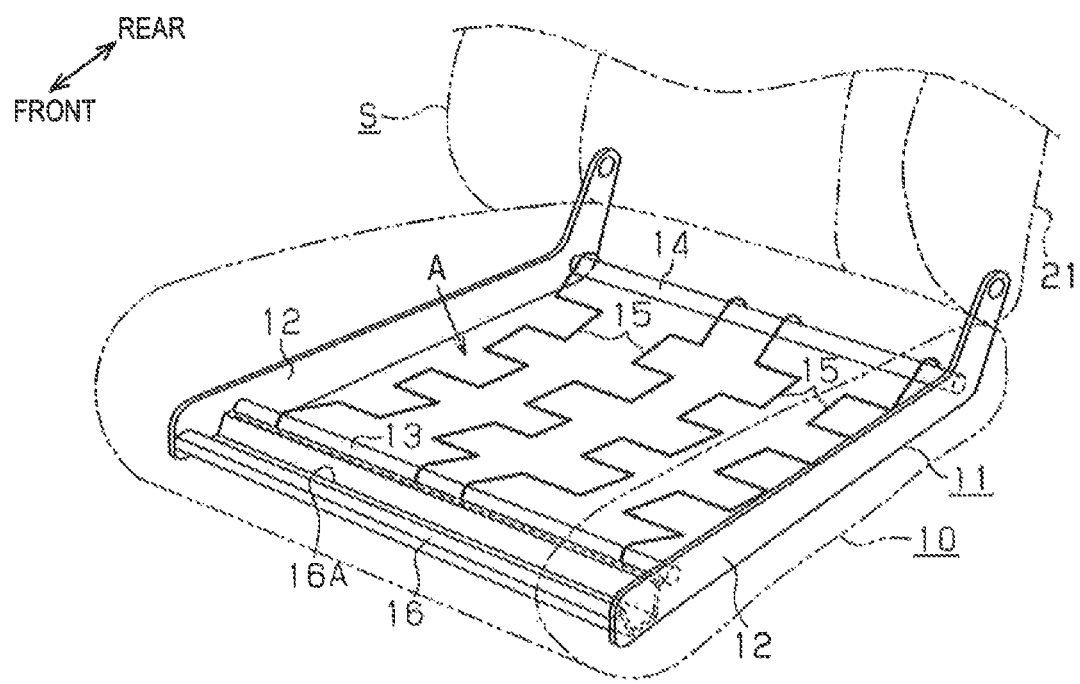
FIG. 3 is a partial perspective view showing a seat frame and a storage case of the car seat according to the embodiment.

The seat portion 10 is a portion on which an occupant P serving as an object to be restrained by a seat cushion airbag device (an object to be restrained) is seated. As shown in FIG. 3, a seat frame 11 forms a framework of the seat portion 10. The seat frame includes: a pair of right and left side frame portions 12; a pair of front and rear connecting frame portions 13, 14; a plurality of wire frame portions 15; and a storage case 16. Both of the side frame portions 12 are formed in a plate shape extending in the front-rear direction, and are provided at positions spaced from each other in the width direction. Both of the connecting frame portions 13, 14 are formed of rods extending in the width direction, and are provided at positions spaced from each other in the front-rear direction so as to be bridged between the side frame portions 12. The plurality of wire frame portions 15 function as tension springs for making a comfortable seat, and are bent in the shape of successive sigmoid curves. The wire frame portions 15 are provided at positions spaced from one another in the width direction, and are tacked between the connecting frame portions 13, 14. In more detail, the connecting frame portions 13, 14 include locking claws (not shown), and the wire frame portions 15 are caught by the locking claws. Further, the wire frame portions 15 and the locking claws form a support portion A which supports a seat cushion 17 from below.

The storage case 16 is disposed adjacent to the front side of the connecting frame portions 13. The storage case 16 includes a storage recess 16A extending in the width direction while an upper surface of the storage recess 16A is opened. Both end portions of the storage case 16 in the width direction are fixed to the side frame portions 12.

Figure 4:
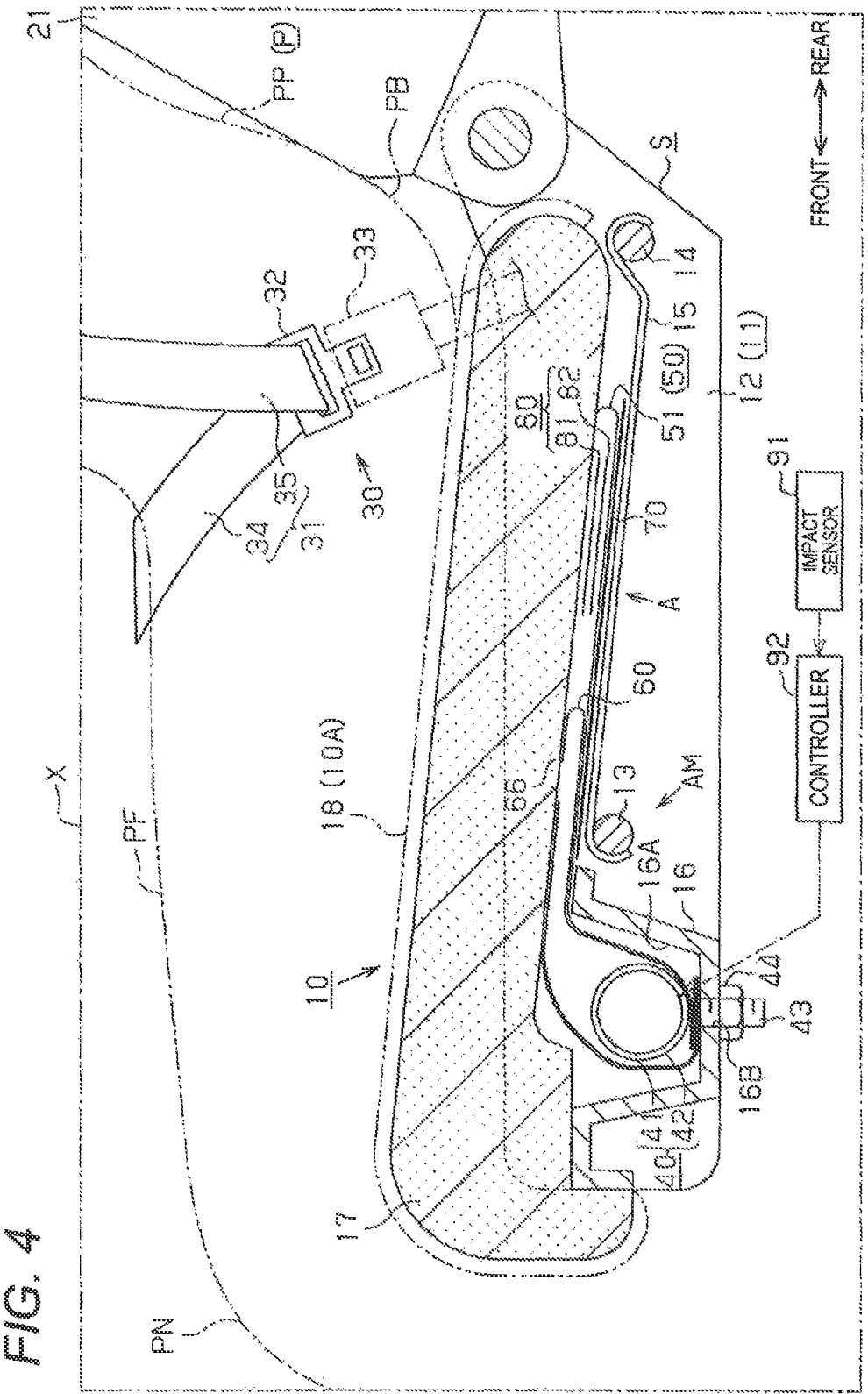
FIG. 4 is an enlarged partial cross-sectional side view showing an enlarged X portion shown in FIG. 1A.

As shown in FIG. 4, the seat cushion 17 is provided on the seat frame 11. The seat cushion 17 is covered with a cover 18 made of fabric, leather, etc. The seat portion 10 is formed by the seat cushion 17 and the support portion A of the seat frame 11 supporting the seat cushion from below.

The car is provided with a seat belt device 30 to restrain the occupant P seated on the car seat S.

As shown in FIGS. 1 and 2, the seat belt device 30 includes: a belt-like webbing 31 which restrains the occupant P; a tongue 32 which is mounted on the webbing 31 to be movable in a longitudinal direction of the webbing 31; and a buckle 33 which is provided on one side (right side in FIG. 2) of the seat portion 10 in the width direction such that the tongue 32 is detachably attached thereto. One end portion of the webbing 31 is fixed to the other side (left side in FIG. 2) of the seat section 10 in the width direction, and the other end portion thereof is wound up by a belt winding device (not shown) provided on the other side of the seat section 10. In the seat belt device 30, the lengths of a lap belt portion 34 and a shoulder belt portion 35 are adjustable by making the tongue 32 slide on the webbing 31.

The lap belt portion 34 is a portion of the webbing 31 which reaches the end portion (fixed end) of the webbing 31 from the tongue 32, and passes from one side of a waist PP of the seated occupant P to the other side thereof via the front of the waist PP. The shoulder belt portion 35 is a portion of the webbing 31 which reaches the belt winding device from the tongue 32, and obliquely passes from a shoulder PS of the seated occupant P to the side of the waist PP via the front of a chest PT.

When the impact is applied to the car from the front side of the car seat S, e.g., by a frontal collision, the waist PP of the occupant P restrained in the car seat S by the seat belt device 30 moves forward. This is a problematic phenomenon in a car. In order to suppress the phenomenon, the car is provided with the seat cushion airbag device (hereinafter referred to as an "airbag device.")

FIG. 4 shows a schematic configuration of the airbag device. However, the details are omitted in FIG. 4. As shown in FIG. 4, the airbag device includes an airbag module AM, an impact sensor 91, and a controller 92. The airbag module AM includes an inflator assembly 40 and an airbag 50. The airbag module AM further includes a contact suppressing sheet 70 which suppresses contact of the airbag against with the support portion A of the car seat S. The details of the airbag module AM will be described with reference to FIGS. 4 to 9.

<Configuration of Inflator Assembly 40>

As shown in FIGS. 4 and 6, the inflator assembly 40 is provided for supplying an inflating gas G (see FIG. 10) serving as an inflating fluid to the airbag 50, and includes an inflator 41 serving as an inflating fluid generation source and a retainer 42 which is attached to an outside of the inflator 41. The inflator 41 has a substantially columnar shape, and stores therein a gas generation agent (not shown). The inflating gas G is generated in this type (pyro-type) of the inflator 41. The inflator 41 is provided with a gas ejection port (not shown) through which the generated inflating gas G is ejected. Harness (not shown) is connected to one end portion of the inflator 41. The harness forms a wire through which a control signal is sent to the inflator 41.

Meanwhile, another type of inflator different from the pyro-type inflator may be used as the inflator 41. A stored gas type inflator where a partition wall of a high-pressure gas cylinder filled with a high-pressure gas is fractured by gunpowder or the like and an inflating gas G is ejected or a hybrid type inflator that is the combination of the stored gas type inflator and the pyro-type inflator may be used as such a type of inflator.

A major portion of the retainer 42 is formed substantially in the shape of a cylinder, which is elongated in the width direction (upper-lower direction in FIG. 5), by the bending or the like of a plate material such as a metal plate. Bolts 43 extending downward are fixed to a lower surface of the retainer 42 at a plurality of positions which are spaced from one another in the width direction.

The inflator 41 may be integrated with the retainer 42.

<Configuration of Airbag 50>

As shown in FIGS. 5 and 7, the airbag 50 includes: an airbag body 51; an inner bag 60; and an inflated thickness restriction member 80.

<Configuration of Airbag Body 51>

The airbag body 51 forms an outer shell of the airbag 50, and causes a seat surface 10A of the seat portion 10 to bulge by the inflation of the airbag. The airbag body 51 is formed in a bag shape by: folding back a fabric piece or a plurality of laminated fabric pieces (also referred to as base fabric, panel fabric, etc.) along a folding line 52 set in the middle of the fabric such that upper and lower portions of the folded fabric piece overlap with each other in the upper-lower direction (i.e., the fabric piece is doubled up); and joining the overlapped upper and lower portions of the fabric. As used herein, the upper portion of the fabric is referred to as an upper fabric portion 53 (see FIG. 5), and the lower portion of the fabric is referred to as a lower fabric portion 54 (see FIG. 7) in order to distinguish two portions overlapped with each other.

The material appropriate for the upper fabric portion 53 and the lower fabric portion 54 is a material of high strength and flexibility, e.g., a woven fabric made of polyester, polyamide, etc.

In a plurality of portions of a front portion of the airbag body 51 (two portions in FIG. 7) which are spaced from each other in the width direction, bolt insertion holes 55 are opened for inserting the bolts 43 of the retainer 42. Further, in the vicinity of a front portion of the bolt insertion holes 55 of the airbag body 51, locking holes 56 are opened for locking a front end portion of the airbag body 51 to the bolts 43.

The upper fabric portion 53 and the lower fabric portion 54 are joined by a peripheral joint 57 provided on peripheries thereof. In the embodiment, the peripheral joint 57 is formed by sewing (seaming using sewing threads) the peripheries of the fabric portions 53, 54 except the front end portions thereof. Side edge joints 62, outer joints 83, 84, and an inner joint 85, which will be described later in detail, are also similarly formed.

The portions made by sewing are represented by three line types in FIGS. 5 to 8 and 12. The first line type is a line (a kind of broken line) represented by intermittently arranging thick lines of constant lengths, which shows a state of the sewing threads in an outside of (i.e., not between) the fabric portions 53, 54 serving as targets of sewing (see FIG. 5 the peripheral joint 57, the outer joint 83, etc.). The second line type is a line (a kind of broken line) represented by intermittently arranging thin lines of constant lengths (which are longer than those in a general broken line, which shows a state of the sewing threads which is located on the back of fabric portions 53, 54 and which can not be directly observed (i.e., hidden by the fabric portions 53, 54) (see FIG. 5: the side edge joints 62, the inner joint 85, etc.). The third line type is a line (a kind of broken line) represented by arranging points at constant intervals, which shows a state of the sewing threads between the fabric portions 53, 54 serving as targets of sewing (see FIG. 8: a part of the peripheral joint 57, the inner joint 85, etc.). In other words, the drawing representing the portions made by sewing by the third line type shows a cross-sectional structure cut by passing through the portions made by sewing.

In the embodiment, since the doubled-up fabric piece is used for forming the airbag body 51, the joint (sawing) by the peripheral joint 57 can be omitted in the vicinity of the folding line 52.

In the embodiment, the fabric piece is folded such that the folding line 52 is positioned in the rear end portion of the airbag body 51. However, the fabric piece may be doubled up such that the folding line 52 is positioned in other end portion. Further, the airbag body 51 may be formed of a plurality of fabric pieces which are divided along the folding line 52. In this structure, the airbag body 51 is formed by laminating a plurality of the fabric pieces in the upper-lower direction and joining the fabric pieces to form a bag shape. As the number of used fabric pieces increases, the strength of the airbag body 51 becomes high. These changes may also be applicable to the inner bag 60 and the inflated thickness restriction member 80.

The peripheral joint 57 may be formed by joint means other than seaming using sewing threads, e.g., adhesion using an adhesive, welding, etc. This alternative may also be applicable to the side edge joints 62, the outer joints 83, 84, and the inner joint 85.

The airbag body 51 has an opened portion 59 formed at a portion of the front end portion of the airbag body 51 where the fabric piece is not joined by the peripheral joint 57. An opened portion 59 is used for inserting the inflator assembly 40 into the airbag body 51, or pulling the harness of the inserted inflator assembly 40 to the outside of the airbag body 51.

<Configuration of Inner Bag 60>

As shown in FIGS. 6 and 7, the inner bag 60 is provided in the airbag body 51 and encloses the inflator assembly 40 therein. The inner bag 60 is formed by folding back a fabric piece or a plurality of layered fabric pieces, along a folding line 61 set in the middle of the fabric such that upper and lower portions of the folded fabric piece overlap with each other in the upper-lower direction (i.e., the fabric piece is doubled up); and joining the overlapped upper and lower portions of the fabric. The inner bag 60 is formed of a woven fabric made of a material similar to that of the airbag body 51, thereby having high strength and flexibility.

The overlapped upper and lower portions of the folded fabric piece are joined by a pair of side edge joints 62. The side edge joints 62 are provided in both side ends of the inner bag 60 in the width direction and extend in the front-rear direction.

In the front portion of the inner bag 60, a pair of bolt insertion holes 63 and a pair of locking holes 64 are opened, similar to the airbag body 51.

Figure 10:
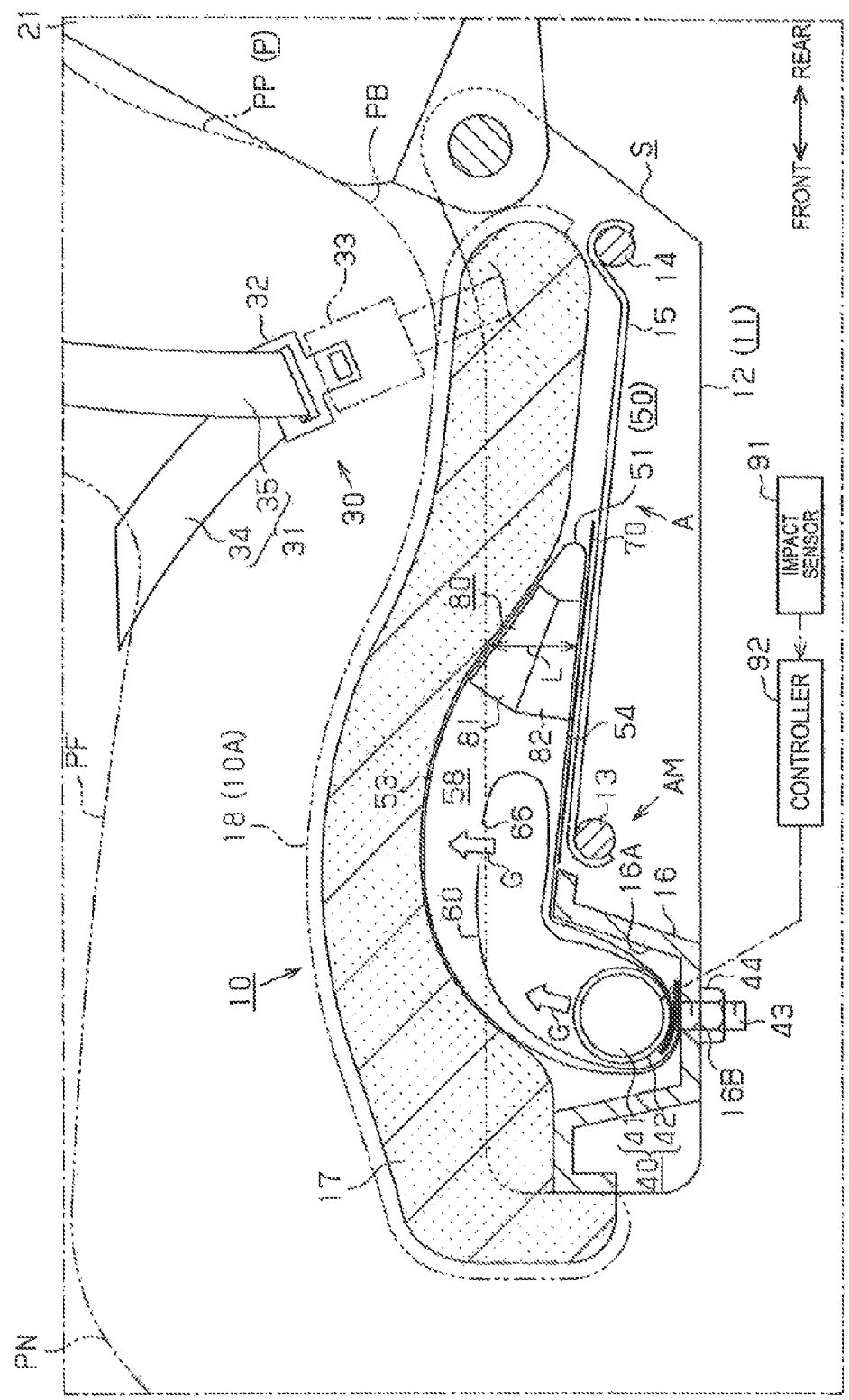
FIG. 10 is a partial cross-sectional side view showing that the inner bag and an inflation portion of the airbag body are inflated from the state of FIG. 4 such that a seat surface of a seat portion bulges.

In the inner bag 60, a portion surrounded by the side edge joints 62 and the folding line 61 is inflated by the inflating gas G (see FIG. 10).

In the embodiment, the doubled-up fabric piece is used for forming the airbag body 51. In addition to the side edge joints 62, the joints for joining the fabric piece may further include a joint provided in the vicinity of the folding line 61 and extending along the folding line 61.

The inner bag 60 has an opened portion 65 formed at a portion of the front end portion of the inner bag 60 and between the side edge joints 62. The opened portion 65 is used for inserting the inflator assembly 40 into the inner bag 60, or pulling the harness (not shown) of the inflator assembly 40 to the outside of the inner bag 60.

As shown in FIGS. 4 and 5, the inner bag 60 has gas ejection holes 66 which allow communication between an inside and an outside of the inner bag 60. The inflating gas G generated by the inflator 41 can be ejected to an inflation portion 58 of the airbag body 51 through the gas ejection holes 66. In the embodiment, two gas ejection holes 66 are provided at positions spaced from each other in the width direction in the upper portion of the inner bag 60 folded in the upper-lower direction. However, the position and number of the gas ejection holes may be arbitrarily changed.

<Attachment of Inner Bag 60>

The inner bag 60 shown in FIG. 7 is arranged in a front half portion of the airbag body 51 in a state in which the bolt insertion holes 63 are positioned to overlap with the bolt insertion holes 55 of the airbag body 51 and the locking holes 64 are positioned to overlap with the locking holes 56 of the airbag body 51. Thereafter, the inner bag 60 is joined to (sewn with) the airbag body 51 by the peripheral joint 57.

The both side end portions of the inner bag 60 may be jointed to the airbag body 51 by a joint other than the peripheral joint 57.

<Configuration of Contact Suppressing Sheet 70>

As shown in FIG. 4 and as described above, the contact suppressing sheet 70 is provided for suppressing contact of the airbag 50 (the airbag body 51) with the support portion A of the car seat S. In the support portion A, a peaked portion, such as a portion in which the wire frame portions 15 is caught by the locking claw, is targeted for the contact suppression by the contact suppressing sheet 70.

In the embodiment, the contact suppressing sheet 70 is formed by laminating a felt on a soft resin sheet made of a synthetic resin such as polyethylene. The felt is formed in the shape of a fabric by the tangling of fiber itself without the weaving and knitting of fiber, and is high in flexibility.

The contact suppressing sheet 70 is fixed to a plurality of positions outside the inflation portion 58 (i.e., a non-inflation portion) of a lower surface of the airbag body 51 by fixing means such as thermal welding.

The contact suppressing sheet 70 may be formed of the felt as a whole, or may be formed of the soft resin sheet as a whole. The contact suppressing sheet 70 may be made of materials other than the felt and the soft resin sheet, e.g., fabrics, paper, cushion materials, etc. The contact suppressing sheet 70 may be fixed to the airbag 50 (the airbag body 51) by fixing means other than thermal welding.

<Configuration of Inflated Thickness Restriction Member 80>

As shown in FIGS. 4 and 8, the inflated thickness restriction member 80 (hereinafter also referred to as a "restriction member") is provided for restricting an inflated thickness of the inflation portion 58 in the upper-lower direction, and have a configuration similar to a member generally called as a tether. As used herein, the inflated thickness means a thickness of the inflation portion 58 when the inflation portion 58 is inflated. The restriction member 80 is provided: in the rear portion of the inflation portion 58 in the front-rear direction; and in the center portion of the inflation portion 58 in the width direction. The restriction member 80 includes a pair of fabric pieces 81, 82 overlapped with each other in the upper-lower direction. As used herein, one of the fabric pieces located on the upper side is also referred to as an upper fabric piece 81, and the other thereof located on the tower side is also referred to as a lower fabric piece 82. Each of the fabric pieces 81, 82 is formed of a woven fabric made of a material similar to that of the airbag body 51, thereby having high strength and flexibility.

As shown in FIGS. 5 and 9, the upper fabric pieces 81 is joined to the upper fabric portion 53 of the airbag body 51 by the outer joint 83. The outer joint 83 is provided in one side edge portion (a lower side in FIG. 5) of the upper fabric piece 81 in the width direction, and extends in the front-rear direction. As shown in FIGS. 8 and 9, the lower fabric piece 82 is joined to the lower fabric portion 54 of the airbag body 51 by the outer joint 84. The outer joint 84 is provided in one side edge portion (a lower side in FIG. 8) of the lower fabric piece 82 in the width direction, and extends in the front-rear direction. The outer joints 83, 84 are positioned to overlap with each other in a state in which the fabric pieces 81, 82 are overlapped with each other.

The fabric pieces 81, 82 are joined to each other by the inner joint 85. The inner joint 85 is provided on the other side edge portion (an upper side in FIGS. 5 and 8) of the fabric pieces 81, 82 in the width direction. The inner joint 85 is inclined by predetermined angles with respect to the front-rear direction such that distances to the outer joints 83, 84 become short toward the rear side.

The restriction member 80 bridges the upper fabric portion 53 and the lower fabric portion 54 through the joints by the outer joints 83, 84 and the joint by the inner joint 85.

Under a non-inflation state of the inflation portion 58, the restriction member 80 is overlapped with each other (see FIG. 4). In contrast, when the inflation portion 58 is inflated, the restriction member 80 is strained in the upper-lower direction (see FIG. 10), thereby restricting the inflated thickness of the inflation portion 58 in the upper-lower direction.

By providing the outer joints 83, 84 and the inner joint 85 as described above, as shown in FIG. 10, when the restriction member 80 is strained in association with the inflation of the inflation portion 58, an upper-lower length L of the restriction member 80 becomes short toward the rear side. Therefore, the restriction member 80 restricts the inflated thickness of the inflation portion 58 in the upper-lower direction so as to become short toward the rear side. With the restriction, in the lower side of the restriction member 80 allows the lower fabric portion 54 to extend in a substantially horizontal direction along the support portion A (the wire frame portions 15) in the front-rear direction, whereas the upper side of the restriction member 80 allows the upper fabric portion 53 to inline downward toward the rear side.

<Attachment of Inflator Assembly 40 to Airbag 50>

As shown in FIGS. 6 and 7, the inflator assembly 40 is inserted in the inner bag 60 (in the airbag body 51) via the opened portions 65, 59, and disposed in the front portion (in the vicinity of the rear side of the opened portions 65, 59) of the inner bag 60 (the airbag body 51) in a posture where the longitudinal direction of the inflator assembly 40 extends along the width direction. Each of the bolts 43 of the retainer 42 is inserted in the corresponding bolt insertion holes 63, 55.

As shown in FIG. 1B, front end portions of the airbag body 51 and the inner bag 60 are wrapped at a front lower portion along the outer peripheral surface of the inflator assembly 40. By the wrap, the locking holes 64 of the inner bag 60 and the locking holes 56 of the airbag body 51 are positioned below the inflator assembly 40. Each of the bolts 43 of the retainer is inserted in the corresponding locking holes 64, 56, whereby the wrapped portion of the inner bag 60 and the wrapped portion of the airbag body 51 are locked by the bolts 43. With the locking, the opened portions 59, 65 of the airbag body 51 and the inner bag 60 are closed, and the wrapped portions are kept to be wrapped on the inflator assembly 40.

As described above, the inflator assembly 40 is attached to the inside of the airbag 50, whereby the airbag module AM is configured. The airbag module AM is arranged and installed in the seat portion 10 of the car seat S by a process described in the following description.

<Arrangement of Airbag Module AM>

As shown in FIG. 4, the front portion of the airbag 50, in which the inflator assembly 40 are arranged, is stored in the storage recess 16A of the storage case 16. Portions of the airbag 50 except the front portion thereof is arranged between the seat cushion 17 and the support portion A in a state in which the airbag 50 is elongated to be in a planar state without filling the airbag 50 with the inflating gas G.

<Install of Airbag Module AM>

As shown in FIG. 1B, the bolts 43, which are inserted in the bolt insertion holes 63 and the locking holes 64 of the inner bag 60 and the bolt insertion holes 55 and the locking holes 56 of the airbag body 51, is inserted in a penetration hole 16B opened in the bottom of the storage recess 16A. As shown in FIG. 4, a nut 44 is screwed to each of the bolts 43, whereby the inflator assembly 40 is fastened to the storage case 16 together with the airbag body 51 and the inner bag 60.

As described above, the airbag device includes the impact sensor 91 and the controller 92, in addition to the airbag module AM. The impact sensor 91 includes an acceleration sensor and the like, and is attached to a front bumper (not shown) of the car. The impact sensor 91 detects an impact applied to the front bumper or the like from the front side in order to detect the frontal collision or the like of the car. The controller 92 controls the inflator 41 based on the detection signal of the impact sensor 91.

As described above, the airbag device of the embodiment is configured. Next, the effect and advantages of the airbag device will be described.

In the airbag device, when the impact from the front side of the car seat S due to the frontal collision or the like is not applied to the front bumper of the car, an activation signal for activating the inflator is not output from the controller 92 to the inflator 41, and the inflating gas G is not supplied from the inflator 41 to the airbag 50. A major part of the airbag 50 except the front portion thereof is kept to be disposed between the support portion A and the seat cushion 17 in a state in which the airbag 50 elongated to be in a planar state (see FIGS. 1A and 4).

At this time, the contact of the airbag 50 with the support portion A is suppressed by the contact suppressing sheet 70. Consequently, it is possible to prevent the scratch of the airbag 50 caused by contacting the support portion A, particularly, the peaked portion thereof such as a portion in which the wire frame portions 15 is caught by the locking claw When an impact is applied to the car from the front side of the car seat S due to the frontal collision of the car or the else, the occupant P is to move forward by inertia. Even when the impact is applied, the occupant P is kept on the seat portion 10 by the holding effect of the seat belt device 30. However, depending on the posture of the occupant P, the waist PP may move the front side.

According to the embodiment, when the impact of a strength higher than the predetermined value is applied to the front bumper due to the impact from the front side, and the impact sensor 91 detects it, the controller 92 outputs the activation signal for activating the inflator 41 to the inflator via the harness based on the detection signal. In response to the activation signal, as shown in FIG. 10, the inflator 41 generates and ejects the inflating gas G. The inflating gas G inflates the inner bag 60, and also inflates the inflation portion 58 through the gas ejection holes 66 of the inner bag 60.

When the inflation portion 58 is inflated between the support portion A of the seat frame 11 and the seat cushion 17, the seat cushion 17 is pushed up, and the seat surface 10A of the seat portion 10 bulges. Then, regions from the backs of the knees PN to the hip PB of the occupant P restrained on the car seat S by the seat belt device 30 is pushed up by the bulging seat surface 10A. The pushed up occupant P, particularly the waist PP thereof, is pressed against the lap belt portion 34 of the seat belt device 30, whereby the restraint of the lap belt portion 34 is increased. Consequently, it is possible to restrict the phenomenon in which the waist PP of the occupant P moves forward on the seat portion 10.

When the inner bag 60 and the airbag body 51 are inflated, as well as when they are not inflated, the contact of the airbag 50 with the support portion A is suppressed by the contact suppressing sheet 70. Consequently, it is possible to prevent the scratch of the airbag 50 caused by contacting the support portion A, particularly, the peaked portion thereof such as a portion in which the wire frame portions 15 is caught by the locking claw.

At the above-described inflation, the inflation portion 58 is to be inflated to exhibit a curved surface shape by the inflating gas G. However, in the rear portion of the inflation portion 58, the restriction member 80 bridges between the upper fabric portion 53 and the lower fabric portion 54. When, the inflation portion 58 is inflated, the restriction member 80 is pulled by the upper fabric portion 53 and the lower fabric portion 54 in the upper-lower direction, thereby being strained. The restriction member 80 restricts the inflated thickness of the rear portion of the inflation portion 58 in the upper-lower direction. By the restriction, on the upper side and the lower side of the restriction member 80, the upper fabric portion 53 and the lower fabric portion 54 are substantially flat in the front-rear direction.

Even when the inflation portion 58 in the inflated state is pushed forward from rear side through the seat cushion 17 by the waist PP of the occupant P which is to move forward, the forward rolling of the airbag 50 around the position attached to the support frame 11 (the front portion of the airbag 50) as a supporting point hardly occurs.

Particularly, the restriction member 80 of the embodiment is provided in the rear portion of the inflation portion 58, and has a shape in which an upper-lower length L thereof becomes short toward the rear side when the restriction member 80 is strained. With the configuration, in the rear portion of the inflation portion 58, the inflated thickness becomes small toward the rear side by the restriction of the inflated thickness by the restriction member 80. As a result, in the rear portion of the inflation portion 58, the upper fabric portion 53 is inclined to become lower toward the rear side. Consequently, in the rear portion of the inflation portion 58, the portion with the reduced inflated thickness in the upper-lower direction is located on the lower side of the hip PB of the occupant P, and exhibits similar effect of a wedge. In other words, in the seat portion 10, the above-described portion of the inflation portion 58 serves like as a wedge which dives between the support portion A of the seat frame 11 and the seat cushion 17.

The seat surface 10A bulges to have a curved surface which is convex upward, whereas a femoral area PF of the occupant P seated on the seat portion 10 has a curved surface which is convex toward the opposite side of the seat surface 10A (i.e., convex downward). If the restriction member 80 is not provided in the inflation portion 58, the seat surface 10A bulges to have a curved surface of convex upward with a large curvature. Therefore, the contact area of the seat surface 10A to the femoral area PF is small.

In contrast, as shown in FIG. 11 of the embodiment, the restriction member 80 is provided in the center portion in the width direction, whereby the inflation portion 58 is partitioned into two regions in the width direction at a portion where the restriction member 80 is provided in the front-rear direction of the vehicle seat (i.e., at the rear portion of the inflation portion 58). Since the inflated thickness of the inflation portion 58 in the upper-lower direction is regulated at one portion by the restriction member 80, each of the two regions of the inflation portion 58 is inflated to have a curved surface being convex upward with a curvature smaller than that in a case in which the restriction member 80 is not provided.

By the inflation, portions of the seat cushion 17 on the upper side of the two regions of the inflation portion 58 are pushed up, and corresponding two portions of the seat surface 10A bulge to have curved surfaces gentler than that in the case in which the restriction member 80 is not provided.

Consequently, the two portions of the seat surface 10A of the seat cushion 17 contact the femoral area PF of the occupant P with a contact area larger than that in a case in which the restriction member 80 is not provided. As a result, the forward movement of the waist PP of the occupant P is received by the seat cushion 17 which contacts the occupant P with the large contact area.

According to the above embodiment described in detail, the following effects and advantages can be obtained.

(1) The airbag device includes the restriction member 80 which extends in the front-rear direction within the inflation portion 58 of the airbag 50 and which bridges the upper fabric portion 53 and the lower fabric portion 54 to restrict the inflated thickness of the inflation portion 58 in the upper-lower direction (FIG. 10).

With the configuration, on the upper side and the lower side of the restriction member 80, the upper fabric portion 53 and the lower fabric portion 54 can be substantially flat in the front-rear direction. Consequently, rolling of the airbag 50 between the support portion A and the seat cushion 17 can be suppressed, whereby the forward movement of the waist PP of the occupant P can be further suppressed.

The restriction member 80 allows the inflation portion 58 to be inflated to have a curved surface being convex upward with a curvature smaller than that in a case in which the restriction member 80 is not provided. By the inflation, a portion of the seat cushion 17 on the upper side of the inflation portion 58 is pushed up, and the seat surface 10A bulges to have a curved surface gentler than that in the case in which the restriction member 80 is not provided.

Consequently, the seat cushion 17 can be allowed to contact the femoral area PF of the occupant P seated on the seat portion 10 with a contact area larger than that in a case in which the restriction member 80 is not provided. As a result, the waist PP of the occupant P is received by the seat cushion 17, and the forward movement of the waist PP can be further suppressed.

(2) The restriction member 80 restricts the inflated thickness in the upper-lower direction to become small toward a rear side of the inflation portion 58 such that the upper fabric portion 53 on an upper side of the restriction member 80 is inclined downward toward the rear side (FIG. 10).

Consequently, a portion with the reduced inflated thickness in the upper-lower direction in the inflation portion 58 is located on the lower side of the hip PB of the occupant P, and can exhibit similar effect of a wedge. As a result, it is possible to further suppress the forward rolling of the airbag 50 around the position attached to the support frame 11 (the front portion of the airbag 50) as a supporting point.

(3) The restriction member 80 has a shape in which an upper-lower length L thereof becomes short toward the rear side when the restriction member 80 is strained in association with inflation of the inflation portion 58 (FIG. 10).

Consequently, the inflated thickness of the inflation portion 58 in the upper-lower direction can become small toward the rear side by the restriction of the inflated thickness by the restriction member 80, whereby the effects and advantages in the above-described item (2) can be provided.

(4) The restriction member 80 is provided in a rear portion of the inflation portion 58 (FIG. 10).

Consequently, the portion with the reduced inflated thickness in the upper-lower direction in the rear portion of the inflation portion 58 is located on the lower side of the hip PB, and can exhibit the similar effect of the wedge.

(5) The restriction member 80 is provided in a center portion of the inflation portion 58 in the width direction (FIG. 11).

With the configuration, the inflation portion 58 is partitioned into two regions in the width direction at a portion where the restriction member 80 is provided in the front-rear direction (the rear portion of the inflation portion 58), and each of the two regions of the inflation portion 58 can be inflated to have a curved surface being convex upward with a curvature smaller than that in a case in which the restriction member 80 is not provided. Therefore, portions of the seat cushion 17 on the upper side of the two regions of the inflation portion 58 can be allowed to bulge to have curved surfaces gentler than that in the case in which the restriction member 80 is not provided. Consequently, the two portions of the seat surface 10A of the seat cushion 17 contact the femoral area PF of the occupant P with a contact area larger than that in a case in which the restriction member 80 is not provided, whereby the forward movement of the waist PP of the occupant P can be further suppressed.

(6) Generally, the tension of the wire frame portions 15 in the car seat S tends to be lowered in the center portion thereof in the width direction as compared with other portions thereof.

When the restriction member 80 is not provided in the airbag (the inflation portion), the airbag is to be largely inflated to have curved surfaces in the upper-lower direction. In this case, the inflated thickness of the airbag (the inflation portion) is largest in the center portion of the car seat S in the width direction. Therefore, the wire frame portions 15 are pushed downward by the airbag (the inflation portion), and are bent most in the center portion of the width direction. Accordingly, bulging of the seat surface of the seat portion by the airbag (the inflation portion) is lost, and the effect of suppressing the forward movement of the occupant is reduced.

In contrast, the restriction member 80 of the embodiment is provided in the center portion in the width direction, thereby restricting the inflated thickness of the center portion to be small. Consequently, the downwardly pushed amount of the wire frame portions 15 by the airbag 50 in the center portion is reduced, and the downwardly bent amount of the wire frame portions 15 in the center portion is also reduced. Therefore, the degree of loss of the bulge is reduced, whereby the effect of suppressing the forward movement of the occupant P can be obtained efficiently.

The invention may be embodied as the following additional embodiments.

<Restriction Member 80>

Figure 13:
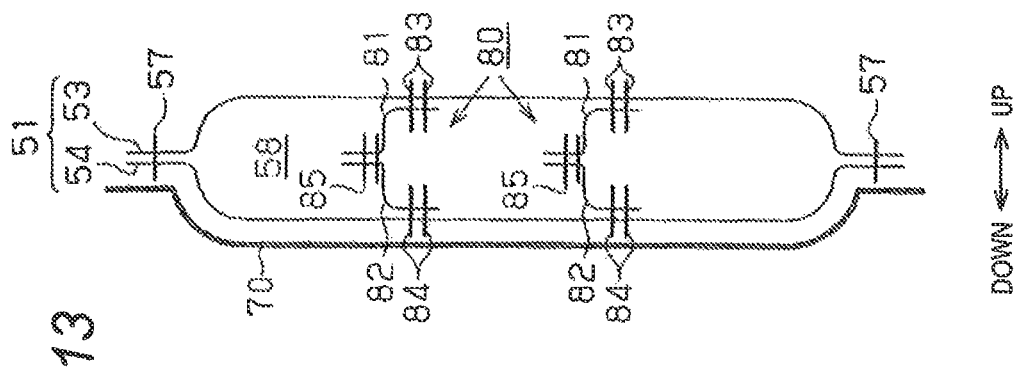
FIG. 13 is a cross-sectional view showing a cross-sectional structure of the airbag module cut along a XIII-XIII line shown in FIG. 12.

As shown in FIGS. 12 and 13, two restriction members 80 may be provided at two positions which are separated from each other and which are located on opposite sides of a reference in the width direction where the center portion of the inflation portion 58 in the width direction is taken as the reference. In the modification, the two restriction members 80 may be provided at positions spaced from the reference with the same distance, or may be provided at positions spaced from the reference with different distances. In FIGS. 12 and 13, the elements similar to those in the above-described embodiment are designated by the same reference symbols.

Figure 14:
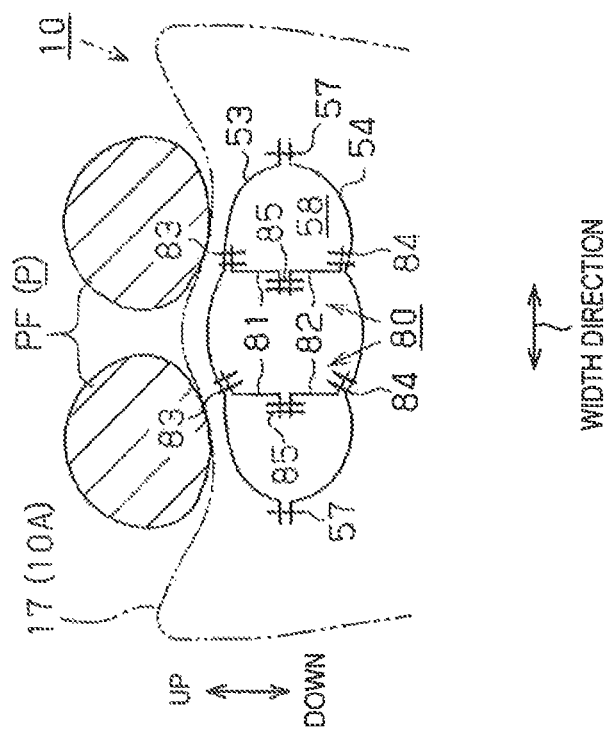
FIG. 14 is a diagram corresponding to FIG. 11 in the modification shown in FIG. 12 and FIG. 13, and is a cross-sectional plan view showing a relationship among the airbag with a restricted inflated thickness, the seat portion, and the femoral area of the occupant.

As shown in FIG. 14, the inflation portion 58 is partitioned into three regions in the width direction at a portion where the two restriction members 80 are provided in the front-rear direction (i.e., at the rear portion of the inflation portion 58. Since the inflated thickness of the inflation portion 58 in the upper-lower direction is regulated at two portions by the restriction members 80, each of the three regions of the inflation portion 58 is inflated to have a curved surface being convex upward with a curvature smaller than that in a case in which a single restriction member 80 is provided.

By the inflation, portions of the seat cushion 17 on the upper side of the three regions of the inflation portion 58 are pushed up, and corresponding three portions of the seat surface 10A bulge to have curved surfaces gentler than that in the case in which a single restriction member 80 is provided in the inflation portion 58. Consequently, the three portions of the seat surface 10A of the seat cushion 17 contact the femoral area PF of the occupant P seated on the seat portion 10 with a contact area larger than that in the case in which a single restriction member 80 is provided, whereby the forward movement of the waist PP of the occupant P can be further suppressed.

<Airbag Body 51>

The airbag body 51 may be formed by the inflation portion 58 in its substantially entirety, or may include a non-inflation portion as a part thereof to which the inflating gas G is not supplied which is not inflated.

<Others>

The airbag body 51 and the inner bag 60 may be provided in the seat portion 10 (between the seat cushion 17 and the support portion A) in a folded state.

The present invention may be applicable to a seat cushion airbag device which does not include the inner bag 60.

Under a condition in which at least a part of the restriction member 80 is provided in the rear portion of the inflation portion 58, the length of the restriction member 80 in the front-rear direction may be changed. For example, the restriction member 80 may have longer length by extending the restriction member in the front direction as compared with the above-described embodiment.

The present invention may be applicable to a vehicle seat S in which the seat cushion 17 is supported by a seat pan which is a plate-like member, instead of the wire frame portions 15. In this case, the contact suppressing sheet 70 may be omitted because the seat pan has no or a few peaked portion which may scratch the airbag body 51 or the like.

The object to be restrained may be other object than the occupant P, e.g., a baggage or the like. Also in the case in which the baggage or the like is placed on the rear portion of the seat portion 10 as the object to be restrained, the similar effects and advantages of the above-described embodiment can be obtained.

The seat cushion airbag device may be applicable to a car seat S arranged to be oriented in the directions other than the front-rear direction of the car, e.g., the direction perpendicular to the front-rear direction (a width direction of the car).

The car, to which the seat cushion airbag device of the invention is applied, is not limited to private cars and may be various industrial cars.

Further, the present invention may be applicable to a seat cushion airbag device mountable to vehicles other than cars, such as airplanes, ships, etc.

An inflating fluid generation source may have a configuration other than the inflator 41. In this case, a fluid other than the inflating gas may be used as the inflating fluid.

What is claimed is:

1. A seat cushion airbag device mountable to a vehicle seat, the vehicle seat comprising a seat portion comprising a seat cushion supported from below by a support portion of a seat frame, the seat cushion airbag device comprising:

an airbag having a front portion attached to the seat frame and comprising:

an inflation portion comprising an upper fabric portion and a lower fabric portion, which are arranged to overlap with each other in an upper-lower direction and which are joined to each other to form a bag shape, the inflation portion being inflated between the support portion and the seat cushion by an inflating fluid supplied from an inflating fluid generation source in response to an impact applied to a vehicle in which the vehicle seat is mounted from a front side of the vehicle seat, the inflating fluid bulging a seat surface of the seat portion and suppressing a forward movement of an object to be restrained on the seat portion; and a restriction member extending in a front-rear direction of the vehicle seat within the inflation portion, the restriction member bridging the upper fabric portion and the lower fabric portion and restricting an inflated thickness of the inflation portion in the upper-lower direction, the restriction member restricting the inflated thickness in the upper-lower direction from a larger thickness in a front side of the inflation portion to a smaller thickness toward a rear side of the inflation portion, and the upper fabric portion on an upper side of the restriction member being inclined downward from the front side of the inflation portion toward the rear side of the inflation portion.

2. The seat cushion airbag device according to claim 1, wherein the restriction member has a shape in which an upper-lower length thereof becomes short toward the rear side when the restriction member is strained in association with inflation of the inflation portion.

3. The seat cushion airbag device according to claim 1, wherein the object to be restrained is positioned, at least, on a rear portion of the seat portion, and wherein the restriction member is provided, at least, in a rear portion of the inflation portion.

4. The seat cushion airbag device according to claim 1, wherein the object to be restrained is seated on the seat portion, and wherein the restriction member is provided in a center portion of the inflation portion in a width direction of the vehicle seat.

5. The seat cushion airbag device according to claim 1, wherein the object to be restrained is seated on the seat portion, and wherein the restriction member comprises two members provided at two positions which are separated from each other and which are located on opposite sides of a reference in a width direction of the vehicle seat, where a center portion of the inflation portion in the width direction of the vehicle seat is taken as the reference.

6. A seat cushion airbag device mountable to a vehicle seat, the vehicle seat comprising:

a seat frame having a support portion supporting a seat portion having a seat cushion, an airbag having a front portion attached to the seat frame, the airbag comprising:

an inflation portion comprising an upper fabric portion and a lower fabric portion, the upper and lower fabric portions overlapping each other in an upper-lower direction and being joined to each other to form a bag shape, the inflation portion being inflated between the seat cushion and the support portion of the seat frame by an inflating fluid supplied from an inflating fluid generation source in response to a frontal vehicle collision received on a front side of the vehicle seat, the inflating fluid bulging a seat surface of the seat portion and inhibiting forward movement of an object to be restrained on the seat portion; and a restriction member extending in a front-rear direction of the vehicle seat within the inflation portion, the restriction member bridging the upper fabric portion and the lower fabric portion and restricting an inflated thickness of the inflation portion in the upper-lower direction, the restriction member restricting the inflated thickness in the upper-lower direction from a larger thickness in a front side of the inflation portion to a smaller thickness toward a rear side of the inflation portion, and the upper fabric portion on an upper side of the restriction member being inclined downward from the front side of the inflation portion toward the rear side of the inflation portion.

* * * * *